United States Patent
Tatarinov et al.

(10) Patent No.: US 8,856,542 B2
(45) Date of Patent: Oct. 7, 2014

(54) SYSTEM AND METHOD FOR DETECTING MALWARE THAT INTERFERES WITH THE USER INTERFACE

(71) Applicant: Kaspersky Lab ZAO, Moscow (RU)

(72) Inventors: Ivan I. Tatarinov, Moscow (RU);
Vladislav V. Martynenko, Moscow (RU); Alexey V. Monastyrsky, Moscow (RU); Mikhail A. Pavlyushchik, Moscow (RU); Konstantin V. Sapronov, Moscow (RU); Yuri G. Slobodyanuk, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/853,468

(22) Filed: Mar. 29, 2013

(65) Prior Publication Data

US 2014/0181971 A1 Jun. 26, 2014

(30) Foreign Application Priority Data

Dec. 25, 2012 (RU) ................................ 2012156439

(51) Int. Cl.
*G06F 21/00* (2013.01)
*G06F 21/56* (2013.01)

(52) U.S. Cl.
CPC .................................... *G06F 21/566* (2013.01)
USPC ........... 713/186; 713/187; 713/188; 713/189; 726/23; 726/24; 709/224

(58) Field of Classification Search
CPC ...... H04L 63/14; H04L 67/22; G06F 11/3438
USPC ................ 713/186–189; 726/23–24; 709/224
See application file for complete search history.

(56) References Cited

U.S. PATENT DOCUMENTS 7,392,160 B2 * 6/2008 Wicks ............................ 702/186
7,533,131 B2   5/2009 Thomas
(Continued)

FOREIGN PATENT DOCUMENTS

CA        2691129         7/2011
WO    WO0072150      11/2000
(Continued)

OTHER PUBLICATIONS

Brian Prince, Attackers Add Ransomware to Bank Fraud malware: Security Researchers, Feb. 5, 2012, eWEEK Interprise IT Technology News, 2 Pages.*

(Continued)

*Primary Examiner* — Luu Pham
*Assistant Examiner* — Fahimeh Mohammadi
(74) *Attorney, Agent, or Firm* — Patterson Thuente Pedersen, P.A.

(57) ABSTRACT

System and method for detecting ransomware. A current user behavior pattern is monitored based on user input via a user input device. The user behavior is compared against a reference set of behavior patterns associated with user frustration with non-responsiveness of the user interface module. A current status pattern of the operating system is also monitored. The current status pattern is compared against a reference set of operating system status patterns associated with predefined ransomware behavior. In response to indicia of current user frustration with non-responsiveness of the user interface, and further in response to indicia of the current status pattern having a correlation to the predefined ransomware behavior, an indication of a positive detection of ransomware executing on the computer system is provided.

26 Claims, 6 Drawing Sheets

(56) References Cited

U.S. PATENT DOCUMENTS

| | | |
|---|---|---|
| 7,941,851 B2 | 5/2011 | Shahar et al. |
| 8,171,550 B2 | 5/2012 | Burtscher |
| 8,429,751 B2* | 4/2013 | Mizrahi et al. .................. 726/25 |
| 2005/0203881 A1* | 9/2005 | Sakamoto et al. ................ 707/3 |
| 2008/0276131 A1* | 11/2008 | Bantz et al. ..................... 714/47 |
| 2008/0310411 A1* | 12/2008 | Yamauchi et al. ............ 370/389 |
| 2009/0138592 A1* | 5/2009 | Overcash et al. ............ 709/224 |
| 2009/0199296 A1* | 8/2009 | Xie et al. ........................ 726/23 |
| 2010/0004977 A1* | 1/2010 | Marci et al. ..................... 705/10 |
| 2010/0325259 A1* | 12/2010 | Schuler ......................... 709/224 |
| 2011/0078794 A1* | 3/2011 | Manni et al. .................... 726/23 |
| 2012/0023026 A1 | 1/2012 | Chen et al. |
| 2012/0167218 A1 | 6/2012 | Poornachandran et al. |
| 2012/0226993 A1 | 9/2012 | Bromer |
| 2013/0050275 A1* | 2/2013 | Miyamoto et al. ............ 345/672 |
| 2013/0067576 A1* | 3/2013 | Niemela ......................... 726/24 |
| 2013/0120248 A1* | 5/2013 | Gilra et al. .................... 345/157 |

FOREIGN PATENT DOCUMENTS

| | | | |
|---|---|---|---|
| WO | WO 0167214 A2 * | 9/2001 | ............... G06F 1/00 |
| WO | WO2010105249 | 2/2010 | |

OTHER PUBLICATIONS

Susan Schaibly, Files for ransom, Sep. 26, 2005, Network World, 3 Pages.*
Michael Cooney, New extortion scheme using Citadel malware invokes Internet Crime Complaint Center, Nov. 30, 2012, 2 Pages.*
Layer 8, DARPA program aims to find, shut backdoor malware holes in commercial IT devices, Nov. 30, 2012, 2 Pages.*

* cited by examiner

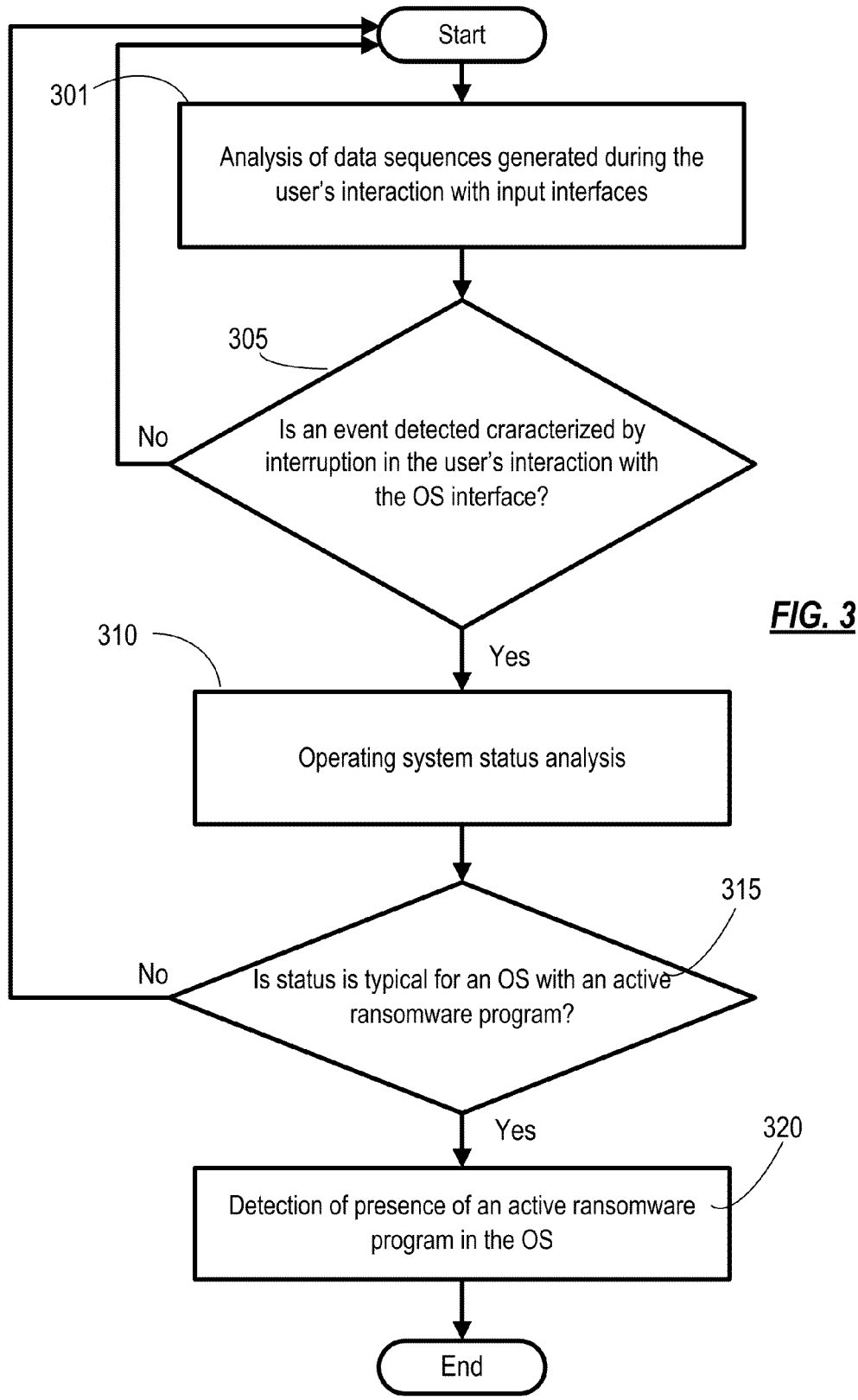

SYSTEM AND METHOD FOR DETECTING MALWARE THAT INTERFERES WITH THE USER INTERFACE

CLAIM TO PRIORITY

This application claims the benefit of Russian Federation Patent Application No. 2012156439 filed Dec. 25, 2012 the disclosure of which is incorporated by reference herein.

FIELD OF THE INVENTION

The invention relates generally to information processing and security and, more particularly, to detecting malicious software that prevents normal user interaction with the operating system, such as ransomware.

BACKGROUND OF THE INVENTION

Malicious computer software, such as viruses, computer worms and trojans, present one of the most important computer security issues. It was calculated that annual financial losses of businesses caused by malicious software amount to tens of billions of dollars.

In recent years, a new type of malicious software, ransomware, has become widespread. The term ransomware as used herein refers to a family of malicious programs that block or impede user interaction with the operating system. Oftentimes, these programs demand the transfer of funds to the offenders in exchange for restoration of the computer's operability. Technically, ransomware programs are a variant of trojan program, which infect their target computer systems using techniques such as attaching executable files to emails, or attacking a vulnerability in the network service to gain access to the target computer system.

In order to combat ransomware, antivirus companies have traditionally used basic signature detection methodology, which is based on the comparison of program codes with the signatures of known malicious programs stored in antivirus databases. Other approaches have used a combination of multiple proactive antivirus security technologies, the main goal of which, in contrast to the reactive (signature-based) technologies, is to prevent infection of the user's system by unknown malicious software. For example, heuristic analysis during code emulation has been combined with behavior analysis in order to prevent infection of the user's operating system with a ransomware program.

In the code emulation mode, the behavior of the operating system and of the central processor is simulated; therefore, the application in question cannot harm the user's operating system. Heuristic analysis based on the application code analysis determines the parts of the code which are responsible for malicious activity. A behavior analysis of the execution mode determines whether a program is malicious, based on its behavior.

The main advantage of these technologies consists in their ability to differentiate safe programs from malicious ones without using a professional virus analyst. One shortcoming, however, is that there is a certain intermediate zone between clearly malicious actions and acceptable actions. Moreover, the same actions or parts of a code can be malicious in a malicious program intended to extort money but useful in legitimate software. For example, running a full-screen application with a window in front of the other windows is used by ransomware programs to complicate the user's interaction with the operating system's graphical interface, but this is quite legitimate in computer games—for example, when a computer game application is run full-screen and does not respond to special key combinations like ALT-F4 or ALT-TAB.

This creates the possibility that antivirus technologies may be unable to detect an unknown ransomware program, which may result in a blockage of the user's interaction with the operating system, and, consequently, a blockage of the user's access to the antivirus product tools. Therefore, there is a need for quickly detecting the presence of an active ransomware program in the operating system, so that the antivirus software can alleviate the problem in a timely manner.

SUMMARY OF THE INVENTION

Aspects of the invention is directed to detecting active ransomware in a computer system. Ransomware is defined herein as malicious software that interferes with, or obstructs, the user interface with the operating system to such an extent that the computer system is made to appear to the user as being unresponsive to user input. Such malware may also attempt to extort funds from the user (i.e., "seek a ransom"), though this latter feature is not a requirement for a piece of malware to be considered ransomware within the present context.

One aspect is directed to a method for detecting malware in a computer system comprising computing hardware that includes a processor and data store, a user input device and a display device. The computer system also includes an operating system executable on the computing hardware, the operating system including a user interface module interfaced with the user input device and the display device. In the method, a current user behavior pattern is monitored based on user input via the user input device. The user behavior is compared against a reference set of behavior patterns associated with user frustration with non-responsiveness of the user interface module. This reference set of behavior patterns may be stored in a synamically-updatable database according to some embodiments. A current status pattern of the operating system is monitored. Monitoring of the status pattern may be as simple as reading certain indicia of the operating system's state, such as a configuration of open windows and handling of input device data, for example. The current status pattern is compared against a reference set of operating system status patterns associated with predefined ransomware behavior. In response to a result of the comparing of the current user behavior pattern against the reference set of behavior patterns being indicative of current user frustration with non-responsiveness of the user interface module, and further in response to a result of the comparing of the current status pattern against the reference set of operating system status patterns being indicative of the current status pattern having a correlation to the predefined ransomware behavior, an indication of a positive detection of ransomware executing on the computer system is provided.

Embodiments of the method may further take remedial actions such as identifying which process is associated with the ransomware, and disabling, or removing, the ransomware to restore normal operability of the computer system for the user.

In another aspect of the invention, a system for detecting ransomware is a computer-based system that includes computing hardware (i.e., including a processor and data store, a user input device and a display device), and is implemented in a computer system that has an operating system executable on the computing hardware and comprising instructions stored in a non-transitory storage medium that, when executed, implement a user interface module that operationally communicates with the user input device and the display device.

The system includes a user input monitoring module, an input data analysis module, an operating system status analysis module, and a decision module, each of which is executable on the computing hardware and comprising instructions stored in a non-transitory storage medium. When executed, the user input monitoring module causes the computing hardware to collect a current user behavior pattern based on user input via the user input device. The input data analysis module causes the computing hardware to compare the user behavior against a reference set of behavior patterns associated with user frustration with non-responsiveness of the user interface module. The operating system status analysis module causes the computing hardware to compare a current status pattern of the operating system against a reference set of operating system status patterns associated with predefined ransomware behavior. The decision module causes the computing hardware to provide an indication of a positive detection of ransomware executing on the computer system in response to an output of the input data analysis module being indicative of current user frustration with non-responsiveness of the user interface module, and further in response to an output of the operating system status analysis module being indicative of the current status pattern having a correlation to the predefined ransomware behavior.

BRIEF DESCRIPTION OF THE DRAWINGS

The invention may be more completely understood in consideration of the following detailed description of various embodiments of the invention in connection with the accompanying drawings, in which:

FIG. 3 is a flow diagram illustrating a process for detecting a ransomware program according to one embodiment of the invention.

Figure 1:
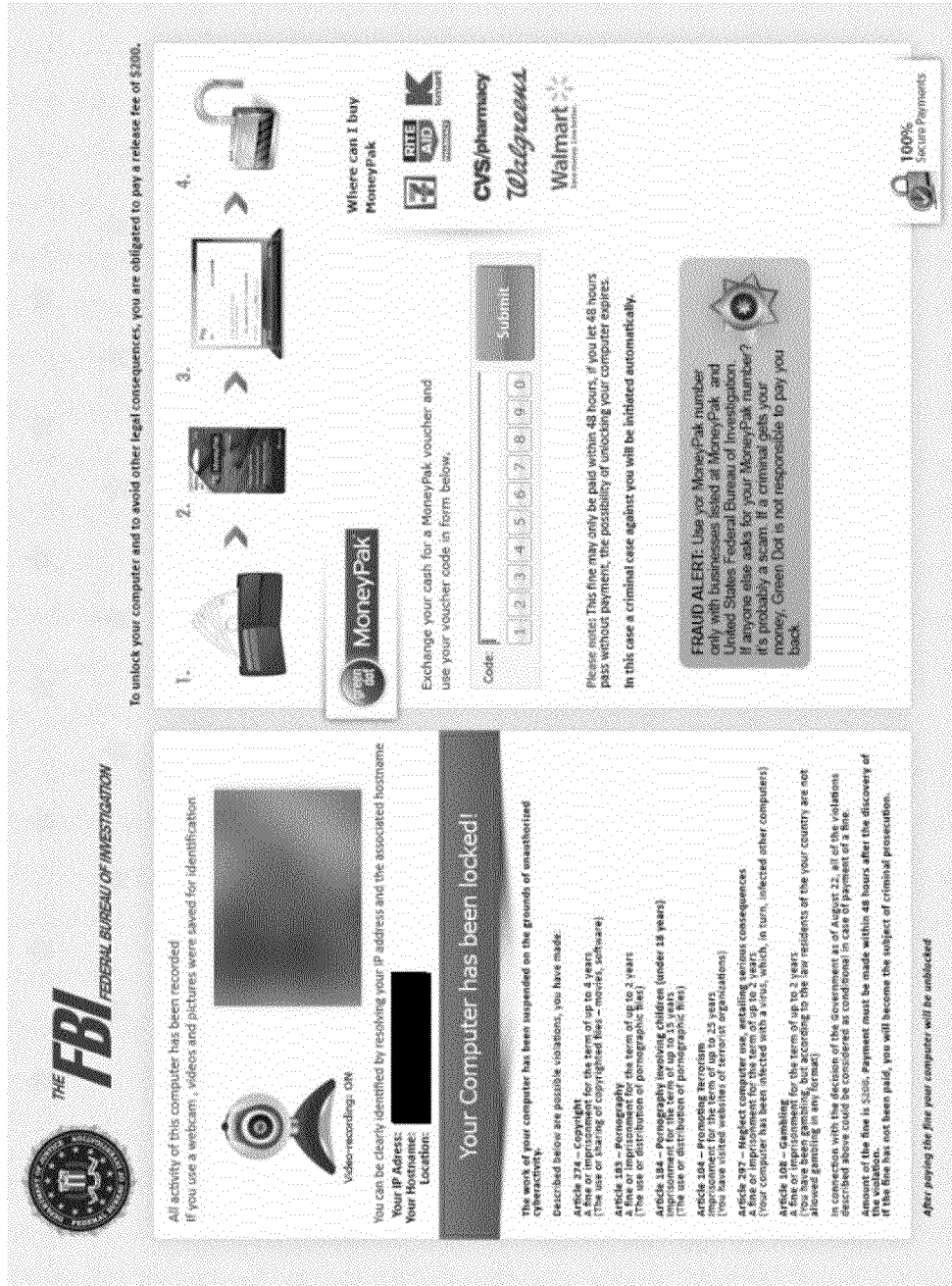
FIG. 1 illustrates an example of ransomware displaying a message on a computer screen with instructions for unlocking the operating system by completing a transfer of funds.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Ransomware programs can be spread through sites offering free software, file sharing sites and hacked legitimate web resources. Often, users download and run malicious programs voluntarily, believing that they are installing legitimate software.

An example of a sequence of typical actions taken by a malicious ransomware program is as follows:

1. Once admitted into the system and run, the malicious program, in order to establish itself in the system, creates a file and writes it into the operating system's autorun.

2. Usually, the malicious program disables the operating system's task manager and the possibility of booting the system in the safe mode. This is done in order to complicate the user's resistance against the ransomware program, which blocks the user's interaction with the operating system.

3. This is followed by the actual mission of the ransomware program. The malicious program blocks the user's interaction with the operating system, displaying, typically over all windows, a window with a message that the computer is locked, and a purported instruction for unlocking it. In the instruction, the offenders, under various pretexts, demand that the user pays for the unlocking codes, and tell the user how he or she will receive the codes to be able to unlock the computer after the payment. A typical example of a window displaying a pretext for locking the computer system, along with instructions is illustrated in FIG. 1.

Lately, authors of ransomware programs sometimes don't even include the unlocking function in the logic of the malicious program's operation. Moreover, this function may no longer be provided in updated versions of the malicious programs which used to "faithfully" allow the user to unlock the computer.

The reasons for this trend are simple. First, it is quite cumbersome for the authors of malicious programs to work with unlocking codes: this requires entering new codes in new versions of malicious programs and constantly monitoring the telephone number match database and the unlocking code database. It is much easier to compile new versions of malicious programs without taking care of the codes, but simply changing mobile phone/account numbers to receive money.

Second, the use of unlocking codes forces the offenders to utilize only such payment methods that allow to send replies to users (generally, this scheme uses premium-type mobile numbers). Without being tied to an unlocking code, offenders can exploit any convenient methods for receiving money.

Finally, the absence of an unlocking code significantly complicates life for the antivirus companies. Previously, companies used to add the unlocking codes found in malicious programs to special unlocking services of known ransomware programs, such as Kaspersky Deblocker. Such services provide users with unlocking codes matching the telephone/account numbers used by offenders and with instructions for curing the operating system. Today, if the ransomware programs do not contain unlocking codes, antivirus companies fight them with special utilities, such as Kaspersky Windows Unlocker. This utility works separately from the infected operating system and is therefore able to eliminate the consequences of the infection, removing files and system registry keys created by the malicious program.

It is clear that if antivirus security modules do not detect a ransomware program, infection of the operating system will result in blockage of the user's interaction with the operating system, and, consequently, the impossibility to access antivirus product modules from the user's side. Therefore, at present, in order to remove the blockage, the user inevitably must utilize special services through an outside computer system.

Aspects of the invention allow the computer system to handle situations where the user's interaction with the operating system is locked by ransomware programs, without using outside utilities or resources, but by identifying situations involving violations in the user's interaction with the operating system's interface.

Figure 2A:
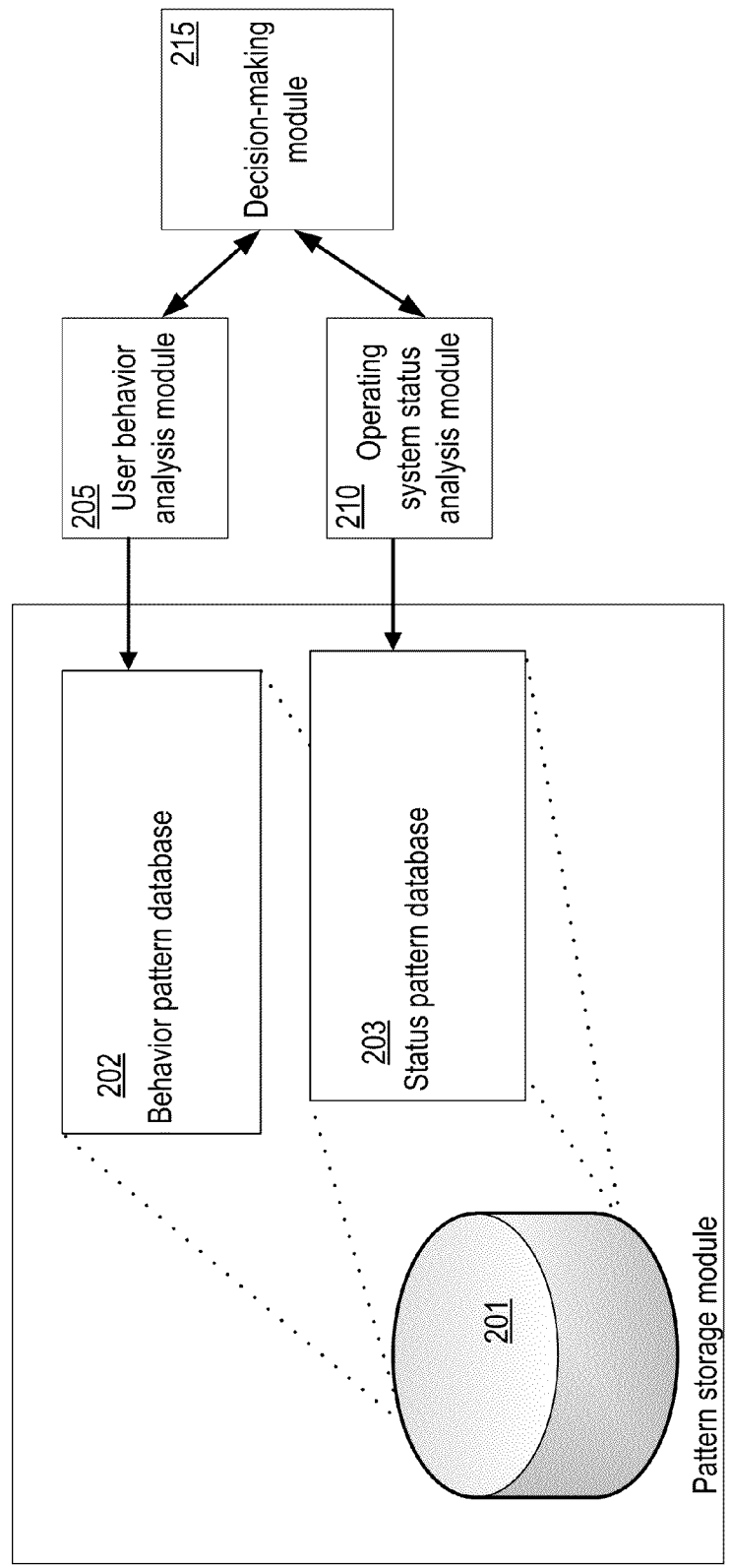
FIG. 2A is a block diagram illustrating a system architecture according to one embodiment of the invention.

FIG. 2A illustrates an exemplary system architecture of one of the embodiments. The system for detecting active ransomware programs in the operating system includes four modules: a pattern storage module 201, a user behavior analysis module 205, an operating system status analysis module 210 and a decision-making module 215.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

The pattern storage module 201 contains at least two updatable databases—a behavior pattern database 202, which determines possible user behavior scenarios in case of interrupted communication between the user and the operating system interface; and a status pattern database 203, which determines how the operating system handles an active ransomware program. The user behavior analysis module 205 is configured to discover such signs in the user's behavior which are typical for certain situations—for example, related to violations or abnormalities in the user's interaction with the operating system interface. During operation, the user behavior analysis module 205 interacts with the pattern storage module 201 to look up known behavior patterns stored in the updatable behavior pattern database 202. The operating system status analysis module 210 compares the current operating system status with the status patterns from the status pattern database 203, characterizing how the operating system handles an active ransomware program. Based on the results of the operation of these two modules, the user behavior analysis module 205 and the operating system status analysis module 210, the decision-making module 215 generates a determination as to whether an active ransomware program is present in the operating system.

The operating system status can only indicate that a ransomware program is active in the operating system, obstructing interaction with the operating system user interface, without stating specifically what application represents that ransomware program. The following are examples of characteristics included in the status patterns from the status pattern database 203, indicating that the operating system has an active ransomware program:

restriction of the cursor operation area; or
disabling one or more control elements, such as the Start button, the task manager, etc.

In one type of embodiment, the operating system status analysis module 210 performs a non-primary role (i.e., a support role) for determining the presence of a ransomware program in the operating system. In one such embodiment, the operating system status analysis module 210 operates to determine whether or not the operating system is free from a ransomware program. In this embodiment, the operating system status analysis module 210 does not independently discover a presence of a ransomware program in the first instance. Instead, the operating system status analysis module 210 can help to check if the user behavior analysis module may have provided a false positive detection of a ransomware program. Therefore, the decision-making module 215 concludes that an active ransomware program is present in the operating system based on data from two analytical modules—the user behavior analysis module 205, which is checked against the output from the operating system status analysis module 210.

Figure 2B:
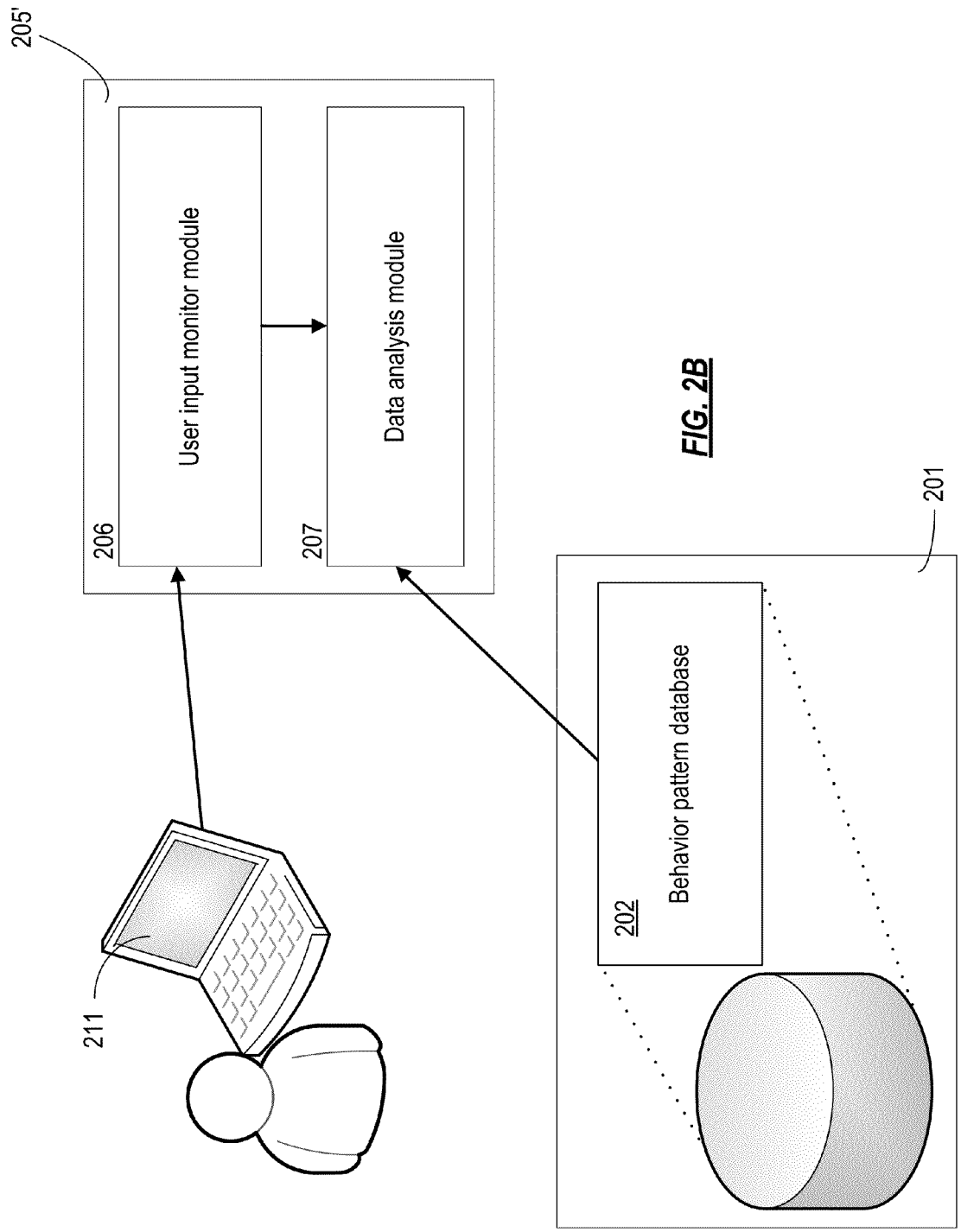
FIG. 2B is a block diagram illustrating interactions during operation of a user behavior analysis module according to an embodiment of the invention.

FIG. 2B illustrates an exemplary structure and principle of operation of the user behavior analysis module 205. In this example, the behavior analysis module 205 includes two main modules. The user input monitoring module 206 comprises various data monitoring tools, executed during the user's interaction with the input interfaces. In certain embodiments, at least one of the data monitoring tools is implemented in hardware, which makes those tool(s) more resilient against attacks. Data analysis module 207 analyzes data sequences and interacts with the pattern storage module 201, using known behavior patterns stored in the updatable behavior pattern database 202, which characterize possible user behavior scenarios in case of interruption of the user's interaction with the operating system interface.

In general, operating system user interfaces include user interface modules and devices for user interaction with a computer's operating system or a user application. These include a graphical user interface that facilitates interaction with the operating system using control elements such as icons, menus, interactive windows, etc.), and input devices that facilitate the user's interaction with the computer hardware. Input devices can include, for example, data input devices, such as a keyboard, a mouse or sensor control elements, as well as devices for photo, video and audio data capture, and the like. The user interface module of a computer system implements a set of operating system functions (including device drivers and in some cases, applications) that receive and process user input from the input devices.

The launch of a ransomware program results in interference with the graphical user interface. The user's interaction via the input devices of computer system 211 generates at least the following data, interception of which is read by data monitoring modules 206:

sequences of symbols entered from a keyboard and temporal relationships between the entered symbols;
commands and coordinates from pointing control devices such as mice, touchpads, and touchscreens;
photo, video and audio data; and
other input data.

From the intercepted data within a certain time window, sequences of data are built and analyzed by the analysis module 207 by comparing them with the behavior patterns from the behavior pattern database 202, characterizing typical user behavior tendencies in response to interruption in the user's interaction with the operating system interface.

The time window for monitoring can be chosen in an interval from a few seconds to several minutes. An alternative to the time window can be, for example, a buffer of a certain size, which builds data sequences for analysis once it is filled. In this case, in one embodiment, the buffer can operate using the FIFO (first in, first out) principle, i.e. when a new pressed key code comes from the keyboard or an event comes from the mouse, the first received data at the beginning of the queue are bumped out by the last data at the end of the queue. In another embodiment, the buffer can be emptied if it does not receive any new data after a period from one second to several minutes.

One example of the description of the user's behavior indicating an interruption in the user's interaction with, for example, a graphic operating system user interface, can be the pressing of a certain combination of preset keys specified in a behavior pattern from the behavior pattern database 202. In a more complex embodiment, an interruption in the user's interaction with the operating system interface can be determined and described in the behavior pattern based on the nature and sequences of the symbols entered by the user—for example, multiple repeated pressing of special key combinations, such as CTRL+ALT+DELETE, ALT+F4, ALT+TAB, CTRL+SHIFT+ESC, etc. Also, the frequency and incoherence of user-pressed keys can indicate the user's panic caused by the blockage of the user's interaction with the operating system. In another embodiment, such signs of user panic can be determined, for example, by analyzing photo/video/audio data, by detecting increased vibrations during the user's interaction with the sensor control module, by detecting deviations from the user's usual behavior, or by other such behavioral criteria.

An exemplary architecture of a behavior analysis module 205, shown in FIG. 2B, allows to implement various scenarios for detecting situations related to obstructions in the user's interaction with the operating system's interface. The capabilities of the behavior analysis module 205 are defined only by the set of input interfaces available in a specific computer system 211, which determine what data monitoring modules 206 are used, and, consequently, determine the methods for describing behavior templates from the behavior template database 202, characterizing the possible user behavior scenarios in case of interruption in the user's interaction with the operating system interface.

The above-identified user behavior scenarios can, in the general case, indicate that the user is experiencing difficulties, and, more specifically, indicate an interruption in the user's interaction with the operating system interface. In certain embodiments, only in combination with a positive verdict from the operating system status analysis module 210, will the presence of such behavior patterns lead the decision-making module 215 to conclude that an active ransomware program is present in the operating system.

Figure 2C:
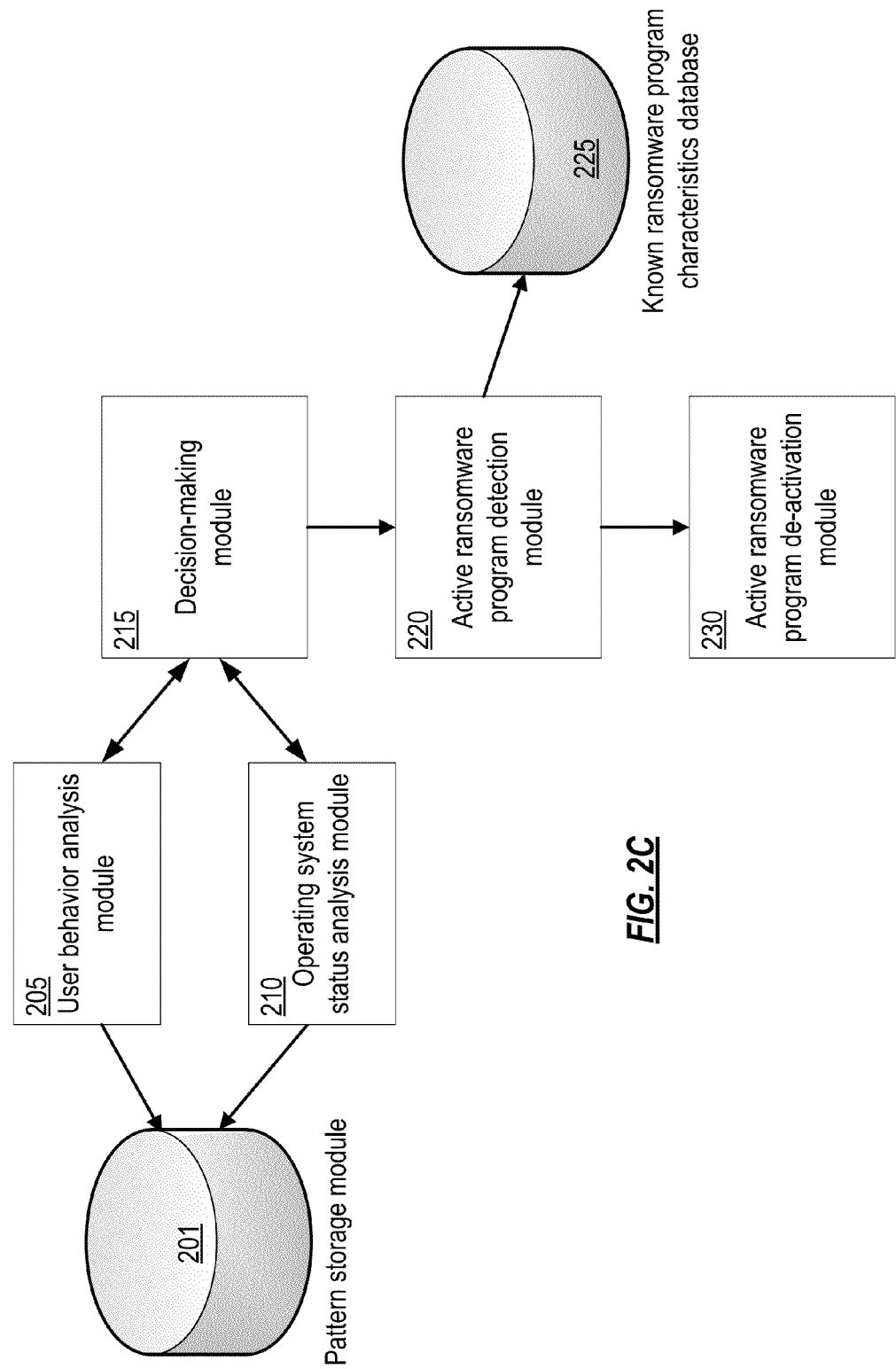
FIG. 2C is a diagram illustrating a system architecture according to another embodiment of the invention.

In a related embodiment of this invention, the system for detection of active ransomware programs in the operating system shown in FIG. 2C additionally includes an active ransomware program detection module 220 and an active ransomware program de-activation module 230.

The active ransomware program detection module 220 compares the sets of characteristics of active processes with the known ransomware program characteristics database 225. Such characteristics can include characteristics of windows and behavior of applications, for example:
- a full-screen window or a window larger than the screen resolution;
- a window with no system window menu (SYSMENU, such buttons as MINIMIZE, MAXIMIZE, etc.) or a CHILD, POPUP window;
- a window with a set TOPMOST flag (window over all other windows) or a TOP flag (a milder condition);
- a window which constantly changes its Z-ORDER parameter to TOP or TOPMOST;
- installed hooks (software handlers of intercepted input) for the keyboard or mouse without further transfer of control (a stringent condition) or simply hooks for the keyboard and mouse (a mild condition);
- an application launching itself in case of deletion from memory, i.e. 2 processes are run from a single executable file, each process tracking the presence of the other one in the memory, etc.

In case of detection of active processes whose characteristics match characteristics of known ransomware programs from the known ransomware program characteristics database 225, the active ransomware program de-activation module 230 performs their forced stoppage.

FIG. 3 illustrates an exemplary process for detecting an active ransomware program in the operating system. Pursuant to this method, block 301 analyzes the data sequences built during the user's interaction with input interfaces, after which block 305 generates a conclusion on the detection of an event characterized by an interruption in the user's interaction with the operating system interface. If no such event is detected, the process loops back to the first block 301. If such event is detected, the process proceeds to block 310, which analyzes the operating system status. If the analysis 310 at block 315 does not detect a status typical for an operating system with an active ransomware program, the method loops back to 301. The presence of an active ransomware program in the operating system at is detected at block 320 only in case of two positive verdicts, when, at block 305, there is an interruption in the user's interaction with the operating system interface, and, additionally, block 315 detects a state of the operating system characterized by the presence of an active ransomware program.

Figure 4:
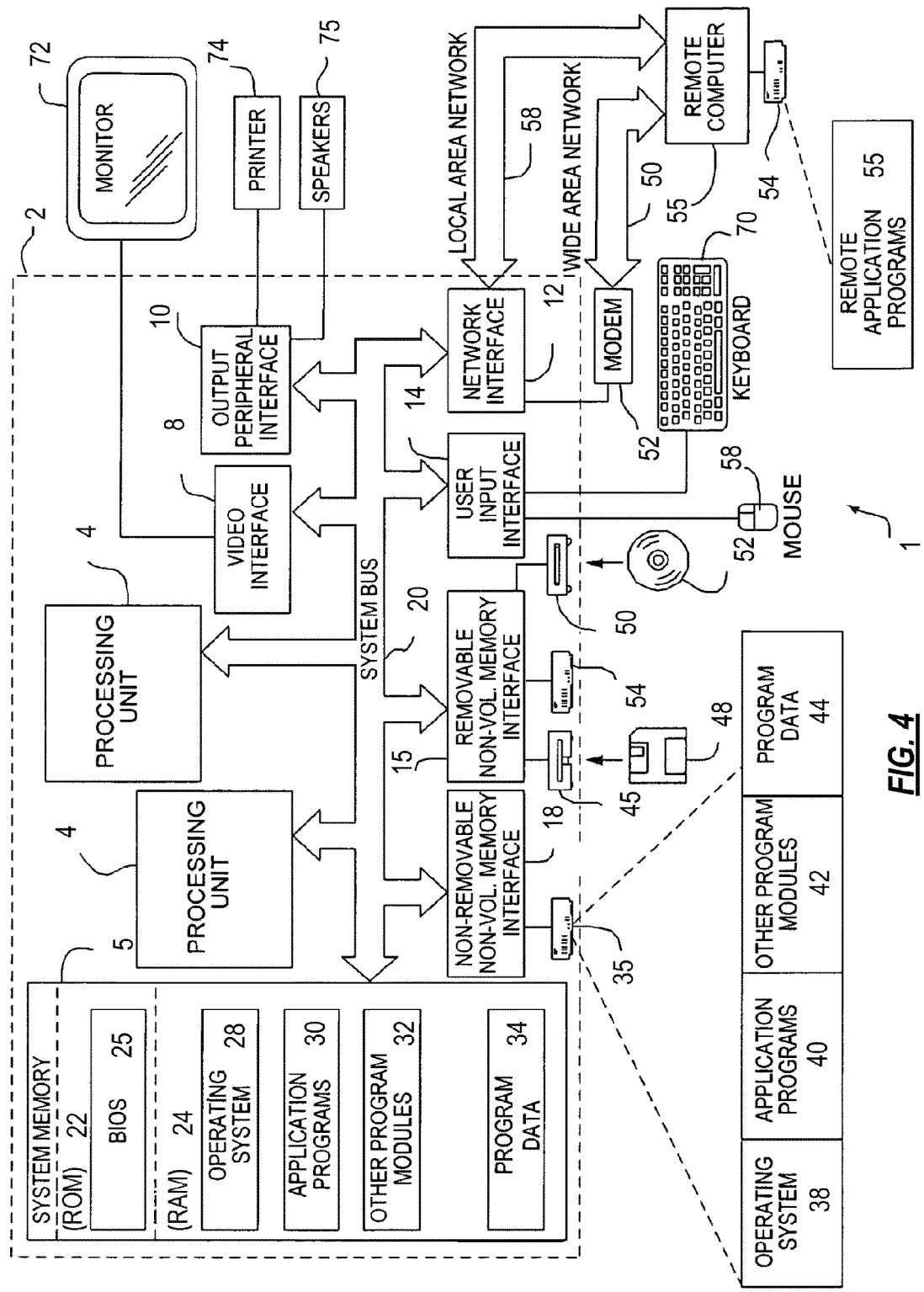
FIG. 4 is a block diagram depicting a general-purpose computer system with which aspects of the invention may be realized according to certain embodiments.

FIG. 4 is a block diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are contemplated. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

It should be noted that aspects of the invention may be implemented using a computer system that is a subset of the general-purpose computer system described above. For instance, the computer system may be a blade server having a relatively limited set of input/output facilities. The computer system may also be implemented as an embedded system operating on a micro controller digital signal processor, application-specific integrated circuit, field programmable gate array, or the like, provided that the system includes sufficient input/output facilities to enable it to interface with a subject computer system being managed or with other computing devices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for detecting ransomware in a computer system comprising computing hardware that includes a processor and data store, a user input device and a display device, and an operating system executable on the computing hardware, the operating system including a user interface module interfaced with the user input device and the display device, the method comprising:

monitoring a current user behavior pattern based on usage of a user input device;
  comparing the user behavior against a predefined reference set of behavior patterns defined as input sequences receivable via the user input device representing expected user responsiveness to interruption of normal user interactivity with the user interface module;

monitoring a current status pattern of the operating system;

comparing the current status pattern against a reference set of operating system status patterns associated with predefined ransomware behavior including interference with operating system responsiveness to user input;

in response to a result of the comparing of the current user behavior pattern against the reference set of behavior patterns being indicative of an interruption of normal user interactivity with the user interface module, and further in response to a result of the comparing of the current status pattern against the reference set of operating system status patterns being indicative of the current status pattern having a correlation to the predefined ransomware behavior, providing an indication of a positive detection of ransomware executing on the computer system.

2. The method of claim 1, further comprising:

in response to the positive detection of ransomware, initiating a ransomware de-activation process to cease operation of the ransomware.

3. The method of claim 1, wherein the monitoring of the current user behavior pattern and the monitoring of the current status pattern of the operating system are performed concurrently during each of a plurality of time windows.

4. The method of claim 1, wherein the monitoring of at least one of the current user behavior pattern and the monitoring of the current status pattern of the operating system includes storing of input data in a buffer, wherein a full buffer is indicative of a gathered pattern to be compared.

5. The method of claim 1, wherein the comparing the current status pattern against a reference set of operating system status patterns is initiated in response to the result of the comparing of the current user behavior against the reference set of behavior patterns being indicative of usage of the user input device in a manner responsive to interruption of normal user interaction with the user interface module.

6. The method of claim 1, wherein the comparing the current status pattern against a reference set of operating system status patterns includes comparing the current status pattern against a pattern indicative of restriction of cursor operation.

7. The method of claim 1, wherein the comparing the current status pattern against a reference set of operating system status patterns includes comparing the current status pattern against a pattern indicative of restriction of graphical user interface control elements.

8. The method of claim 1, wherein monitoring the current user behavior pattern includes monitoring the user input device for at least one sequence of keystrokes.

9. The method of claim 1, wherein monitoring the current user behavior pattern includes monitoring the user input device for movement of a pointing device.

10. The method of claim 1, wherein monitoring the current user behavior pattern includes monitoring the user input device for at least one of video data, audio data, or any combination thereof.

11. The method of claim 1, wherein comparing the current user behavior against the reference set of behavior patterns includes comparing the current user behavior against at least one predefined sequence of keystrokes.

12. The method of claim 1, wherein comparing the current user behavior against the reference set of behavior patterns includes comparing the current user behavior against at least one predefined sequence of pointing device movements.

13. The method of claim 1, wherein comparing the current user behavior against the reference set of behavior patterns includes comparing the current user behavior against at least one predefined pattern of audio data, video data, or any combination thereof.

14. A system for detecting ransomware, the system comprising:

computing hardware including a processor and data store, a user input device and a display device;

an operating system executable on the computing hardware and comprising instructions stored in a non-transitory storage medium that, when executed, implement a user interface module that operationally communicates with the user input device and the display device;

a user input monitoring module executable on the computing hardware and comprising instructions stored in a non-transitory storage medium that, when executed, cause the computing hardware to collect a current user behavior pattern based on user input via the user input device;

an input data analysis module executable on the computing hardware and comprising instructions stored in a non-transitory storage medium that, when executed, cause the computing hardware to compare the user behavior against a predefined reference set of behavior patterns defined as input sequences receivable via the user input device representing expected user responsiveness to interruption of normal user interactivity with the user interface module;

an operating system status analysis module executable on the computing hardware and comprising instructions stored in a non-transitory storage medium that, when executed, cause the computing hardware to compare a current status pattern of the operating system against a reference set of operating system status patterns associated with predefined ransomware behavior including interference with operating system responsiveness to user input;

a decision module executable on the computing hardware and comprising instructions stored in a non-transitory storage medium that, when executed, cause the computing hardware to provide an indication of a positive detection of ransomware executing on the computer system in response to an output of the input data analysis module being indicative of an interruption of normal user interactivity with the user interface module, and further in response to an output of the operating system status analysis module being indicative of the current status pattern having a correlation to the predefined ransomware behavior.

15. The system of claim 14, further comprising:

a ransomware de-activation module executable on the computing hardware and comprising instructions stored in a non-transitory storage medium that, when executed, cause the computing hardware to initiate a ransomware de-activation process to cease operation of the ransomware in response to the positive detection of ransomware.

16. The system of claim 14, wherein the current user behavior pattern and the current status pattern of the operating system are collected concurrently during each of a plurality of time windows.

17. The system of claim 14, wherein the user input monitoring module is configured to store input data in a buffer, and wherein the input data analysis module is configured to recognize a full buffer as being indicative of a gathered pattern to be compared.

18. The system of claim 14, wherein the operating system status analysis module is configured to compare the current status pattern against a reference set of operating system status patterns in response to the output of the input data analysis module being indicative of usage of the user input device in a manner responsive to interruption of normal user interaction with the user interface module.

19. The system of claim 14, wherein the operating system status analysis module is configured to compare the current status pattern against a pattern indicative of restriction of cursor operation.

20. The system of claim 14, wherein the operating system status analysis module is configured to compare the current status pattern against a pattern indicative of restriction of graphical user interface control elements.

21. The system of claim 14, wherein the user input monitoring module is configured to monitor the user input device for at least one sequence of keystrokes.

22. The system of claim 14, wherein the user input monitoring module is configured to monitor the user input device for movement of a pointing device.

23. The system of claim 14, wherein the user input monitoring module is configured to monitor the user input device for at least one of video data, audio data, or any combination thereof.

24. The system of claim 14, wherein the input data analysis module is configured to compare the current user behavior against at least one predefined sequence of keystrokes.

25. The system of claim 14, wherein the input data analysis module is configured to compare the current user behavior against at least one predefined sequence of pointing device movements.

26. The system of claim 14, wherein the input data analysis module is configured to compare the current user behavior against at least one predefined pattern of audio data, video data, or any combination thereof.

* * * * *